(12) United States Patent
Beard

(10) Patent No.: US 6,172,712 B1
(45) Date of Patent: Jan. 9, 2001

(54) TELEVISION WITH HARD DISK DRIVE

(75) Inventor: Paul Beard, Milpitas, CA (US)

(73) Assignee: Intermec IP Corp., Beverly Hills, CA (US)

( * ) Notice: Under 35 U.S.C. 154(b), the term of this patent shall be extended for 0 days.

(21) Appl. No.: 09/223,218

(22) Filed: Dec. 30, 1998

Related U.S. Application Data

(60) Provisional application No. 60/070,285, filed on Dec. 31, 1997.

(51) Int. Cl.$^7$ .................................................. H04N 7/00
(52) U.S. Cl. ........................ 348/552; 348/559; 348/143; 386/82
(58) Field of Search ..................................... 348/559, 560, 348/10, 552, 553, 700, 714, 125, 131, 143, 162, 92, 91; 382/101, 141; 386/82, 90, 66, 68–70, 124, 125

(56) References Cited

U.S. PATENT DOCUMENTS

| | | | |
|---|---|---|---|
| 5,389,976 | 2/1995 | Miyagawa et al. | 348/571 |
| 5,394,249 * | 2/1995 | Shimoda et al. | 386/124 |
| 5,475,835 * | 12/1995 | Hickey | 348/552 |
| 5,572,259 | 11/1996 | Nohara | 348/441 |
| 5,590,252 | 12/1996 | Silverbrook | 395/133 |
| 5,649,048 | 7/1997 | Tomita et al. | 386/131 |
| 5,748,254 * | 5/1998 | Harrison et al. | 348/552 |

* cited by examiner

Primary Examiner—Victor R. Kostak
(74) Attorney, Agent, or Firm—Akin, Gump, Strauss, Hauer & Feld, LLP

(57) ABSTRACT

A television with hard disk drive comprises an analog video source which may be digitized and stored on a hard disk drive for later playback wherein the stored video data is capable of being played back at a rate slower, faster, or the same as the original analog video signal, thereby providing a viewer with flexibility in viewing a program. Also disclosed is a method for viewing a television program or other video material employing the apparatus according to the present invention.

26 Claims, 5 Drawing Sheets

TELEVISION WITH HARD DISK DRIVE

RELATED APPLICATION

This application claims priority under 35 U.S.C. § 119(e) to U.S. provisional application Serial No. 60/070,285, filed Dec. 31, 1997.

BACKGROUND OF THE INVENTION

The present invention relates generally to the field of digitization and storage of an analog video signal and, more particularly, to a television equipped with a mass storage device wherein digitized video input may be stored for later viewing.

Typically, video storage systems employ a television in conjunction with a video cassette recorder whereby an analog video signal such as a TV show may be preserved on magnetic tape for later playback.

Several methods have been devised to eliminate the commercials or advertisements from a recorded video broadcast by pausing the recording during commercials and resuming recording when the commercials are over. Such methods rely on changes in the broadcast signal that typically mark the transition from program to commercial, such as a brief blank signal, or changes in the level of the audio signal. However, such systems are prone to cause a loss of some of the desired programming as well as the commercials in that a video tape recorder (VTR) typically will not immediately resume recording as soon as the change in the video signal is detected, or part of the program may incorrectly be perceived as a commercial and cause the VTR to pause during the program.

Another method for avoiding the interruption of commercials is to simply record a show on a video tape recorder and then watch it at a later time and fast forward through the commercials. This increases continuity in the action, decreases the time required to view a program, and allows a viewer to pause the program at any time, and to replay portions of interest or that were missed. However, watching a recorded program precludes the use of the video tape recorder to record another program.

It would therefore be desirable to provide a video storage and playback system which would enable a user to preserve a video signal, e.g., a cabled or broadcast or other video signal, and which is capable providing a user with complete flexibility over the replay of the program, e.g., pausing, eliminating commercials, replaying portions, etc., and which gives a user flexibility in watching televised or other video material.

SUMMARY OF THE INVENTION

It is therefore an object of the present invention to provide a television with video signal digitizing circuitry for converting an analog video signal to digitized form and a mass storage device such as a hard disk drive for storing the digitized information.

Another object of the present invention is to provide an apparatus and method for the storage and playback of a video signal whereby a user can watch TV programming in a period of time that is shorter than the time of the original programming.

Yet another object of the present invention is to provide an apparatus and method for the storage and playback of a video signal whereby commercials can be skipped or otherwise eliminated upon viewing.

Still another object of the present invention is to provide an apparatus and method for the storage and playback of a video signal whereby the user may pause viewing at any time during viewing and resume viewing at a later time. Preferably, portions of a broadcast may be replayed during the pause. Also, when playback is resumed, it may optionally be replayed at a slightly faster rate in order to reduce viewing time.

Another object of the present invention is to provide an apparatus for digitizing and storing selected portions of a video signal. In this manner, video still images can be stored, or selected frames may be saved for replay and/or storage as a time lapse video.

These and other objects and advantages of the present invention are provided by the television with hard disk drive according to the present invention which comprises an analog video source which may be digitized and stored on a hard disk drive for later playback wherein the stored video data is capable of being played back at a rate slower, faster, or the same as the original analog video signal.

Because of the relatively large disk space required to store digitized video, the hard disk drive functions primarily as a temporary storage device to be watched and then re-recorded over, however, the functionality of a video tape recorder may also be achieved by the present invention through the use of a plurality of hard drives, removable hard drive media, or sufficiently fast high-capacity removable data storage media.

The apparatus according to the present invention provides an advantage in that it allows a viewer to skip portions of a TV broadcast such as commercials, display something else on the screen during the broadcast, e.g., when commercials are on, pause display of a TV broadcast at any time, replay a portion of a TV broadcast, or allow a viewer to save frames or portions of a TV broadcast. The apparatus according to the present invention also allows a user to replay the stored video at a rate that is either faster or slower than the signal was originally transmitted. Replay rate may be increased either by increasing the frame rate to a slightly higher value, or by frame dropping, i.e., employing the same frame rate as the original signal, but omitting one or more frames during playback, or by a combination of increasing the frame rate and frame dropping. Likewise, the replay rate may be decreased by decreasing the frame rate to a slightly lower value, by frame insertion, i.e., employing the same frame rate as the original signal, but playing one or more frames more than once during playback.

The apparatus according to the present invention wherein the rate of playback is selectable by the user provides many advantages over a conventional television. The present invention preferably has the capability to function in the same manner as a conventional television in non-record mode, i.e., by bypassing the digitizing and storage means and allowing a user to simply watch the original analog signal. In addition, the apparatus according to the present invention, when in record mode, preferably allows a user to watch the original video signal while simultaneously storing the video signal, thus allowing the user to pause watching at any time and then begin watching at a later time from where he or she left off. During the replay, the replay rate may be increased in order to decrease the effect of the pause in viewing on the overall time required to complete the viewing of a desired program. If the initial pause in viewing is sufficiently brief, the stored video replay may be replayed at a faster rate in order to eventually "catch up" to the incoming analog signal at which point the originally broadcast signal may then be watched. In addition to pausing viewing, a user may rewatch a portion of the show and then resume viewing from the stored video.

The apparatus according to the present invention also allows a viewer to view a program in a period of time that is shorter than time to broadcast the original program. For example, the apparatus according to the present invention can begin recording a broadcast and a viewer can begin watching the program replayed from the recorded data sometime during the program, or after the broadcast is completed. The program can be watched at a slightly faster replay rate so as not to be perceptibly different in speed from the original analog signal. The time can be further reduced by skipping the commercials, either by providing a manual fast forward function or using a commercial detection algorithm, for example, one which is capable of recognizing the video pattern typically broadcast just before a commercial is broadcast, one which detects the typical increase in sound level or compression level of the commercials' associated sound signal, or through a digital signal transmitted with the analog composite video signal, and the like. For example, a one hour television program will typically contain 12 minutes of commercials. By recording a program and replaying it at 2 fps faster than the broadcast signal, e.g., at 32 fps for an NTSC signal, and eliminating the commercials, the one-hour program can be watched in under 45 minutes.

It may be desirable to record a video signal and then replay it at a rate that is slower than the original signal, for example, when a user begins watching a program at the time that it is broadcast, in order to allow enough of a buffer to accumulate in order to skip later occurring commercials, or replay portions.

It is to be understood that both the foregoing general description and the following detailed description are exemplary and explanatory only and are not restrictive of the invention as claimed.

The accompanying drawings, which are incorporated into and constitute a part of the specification, illustrate an embodiment of the invention and, together with the general description, serve to explain the principles of the invention.

BRIEF DESCRIPTION OF THE DRAWINGS

The numerous objects and advantages of the present invention may be better understood by reference to the accompanying drawings in which.

DETAILED DESCRIPTION OF THE INVENTION

Although the present invention as described herein will be discussed primarily in terms of a "video" signal, it is to be understood that as used herein, the terms "video," "video signal," "digitized video," etc., are intended to refer to a video signal and the associated audio, unless specifically stated otherwise.

Also, the term "broadcast" as used herein is exemplary and is intended to encompass not only FM radio waves modulated with a video signal, but also cabled signals or signals from other analog video sources.

Figure 1:
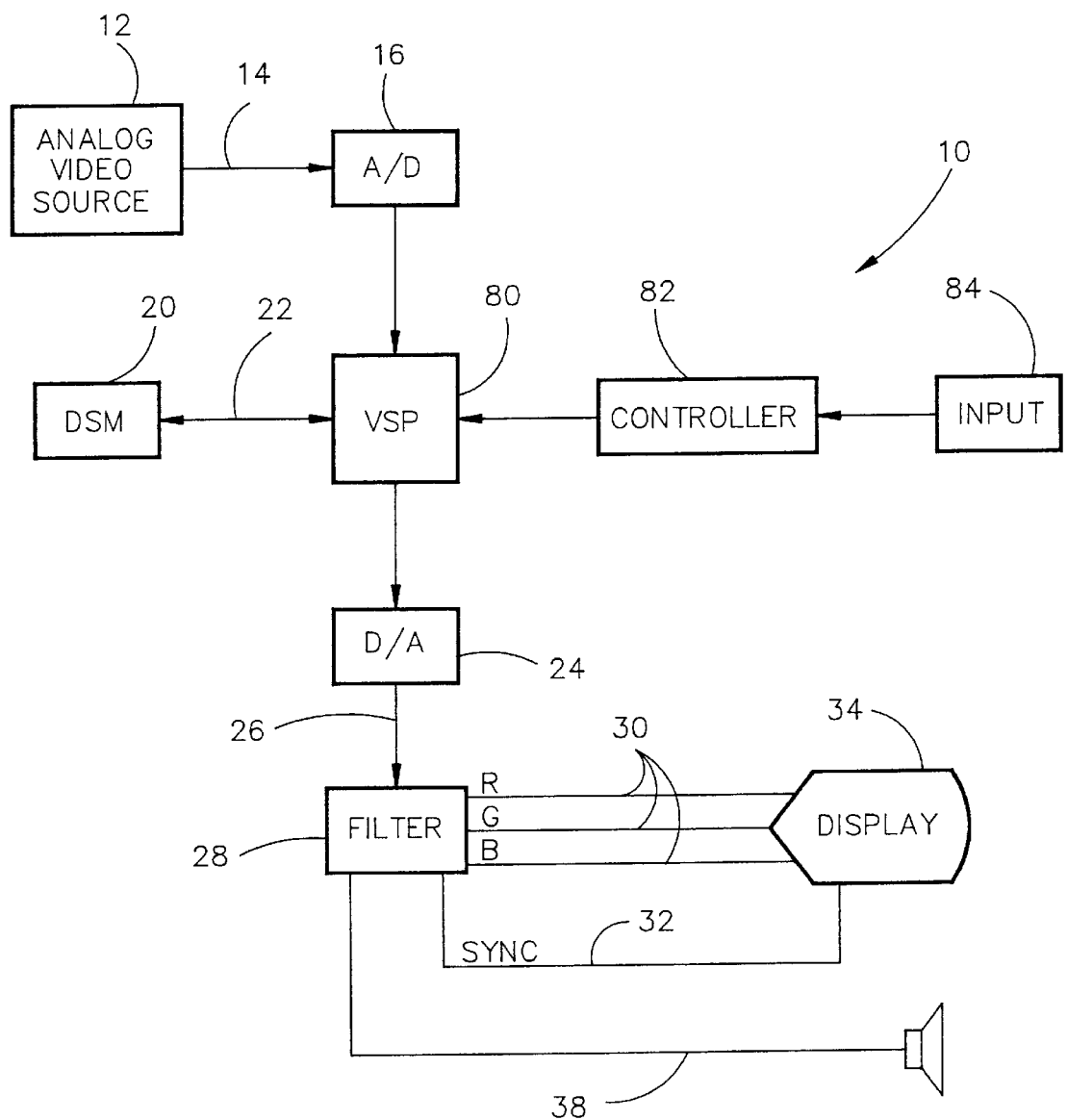
FIG. 1 is a block diagram of the architecture of a basic embodiment present invention.

FIG. 1 is a block diagram of the architecture of a preferred embodiment of the television with hard disk drive 10 according to the present invention. An analog video source 12 provides a composite video signal 14 which is converted to a digital signal by analog to digital converter 16. The digital signal is fed to video signal processor 80 which performs computationally intensive processing of the digital signal which is transferred via data bus 22 to digital storage medium 20 which is preferably a high capacity hard disk drive, preferably having a capacity of one or several, or more, gigabytes. The digital signal is preferably compressed using an intraframe or intraframe and interframe compression/decompression (CODEC) and is preferably stored in a known video data format, including but not limited to, MPEG, MJPEG, AVI, DVI/RTV, Indeo Video, and the like.

Upon playback, the video data is transferred from digital storage medium 20 and decompressed via video signal processor 20. The uncompressed digital signal is then converted to an analog signal via digital to analog converter 24 which outputs a reconstructed composite video signal 26. Signal 26 is then fed to a conventional filter or separator 28, such as a comb filter or equivalent (i.e., a digital comb filter), for separating the composite video signal 26 into separate luminance (Y), chrominance (C), synchronization, and audio components. R, G, B signals 30 and synchronization signal 32 are sent to display 34. Display 34 is typically a picture tube but may also be an LCD, gas plasma display, other flat panel display, and the like. Control circuitry 82 is provided to control output of the stored video data in response to user input via input device 84. Controller 82 may additionally comprise logic circuitry or a general purpose microprocessor that provides logic control over basic functions such as power on and off, channel selection, volume control, and the like. Controller 82 preferably additionally comprises, or is in communication with, an infra red receiver. Control circuitry 82 allows a viewer to pause and resume playback of the stored video data and to control the rate of playback of the video data. Input device 84 may be a keyboard or hand held remote control unit, preferably connected via an infra red or other wireless link.

Television 10 according to the present invention most advantageously comprises circuitry allowing analog signal 14 to bypass the digitizing and storage circuitry, thus allowing the original signal to be fed directly to separator/filter 28 without processing.

Figure 2:
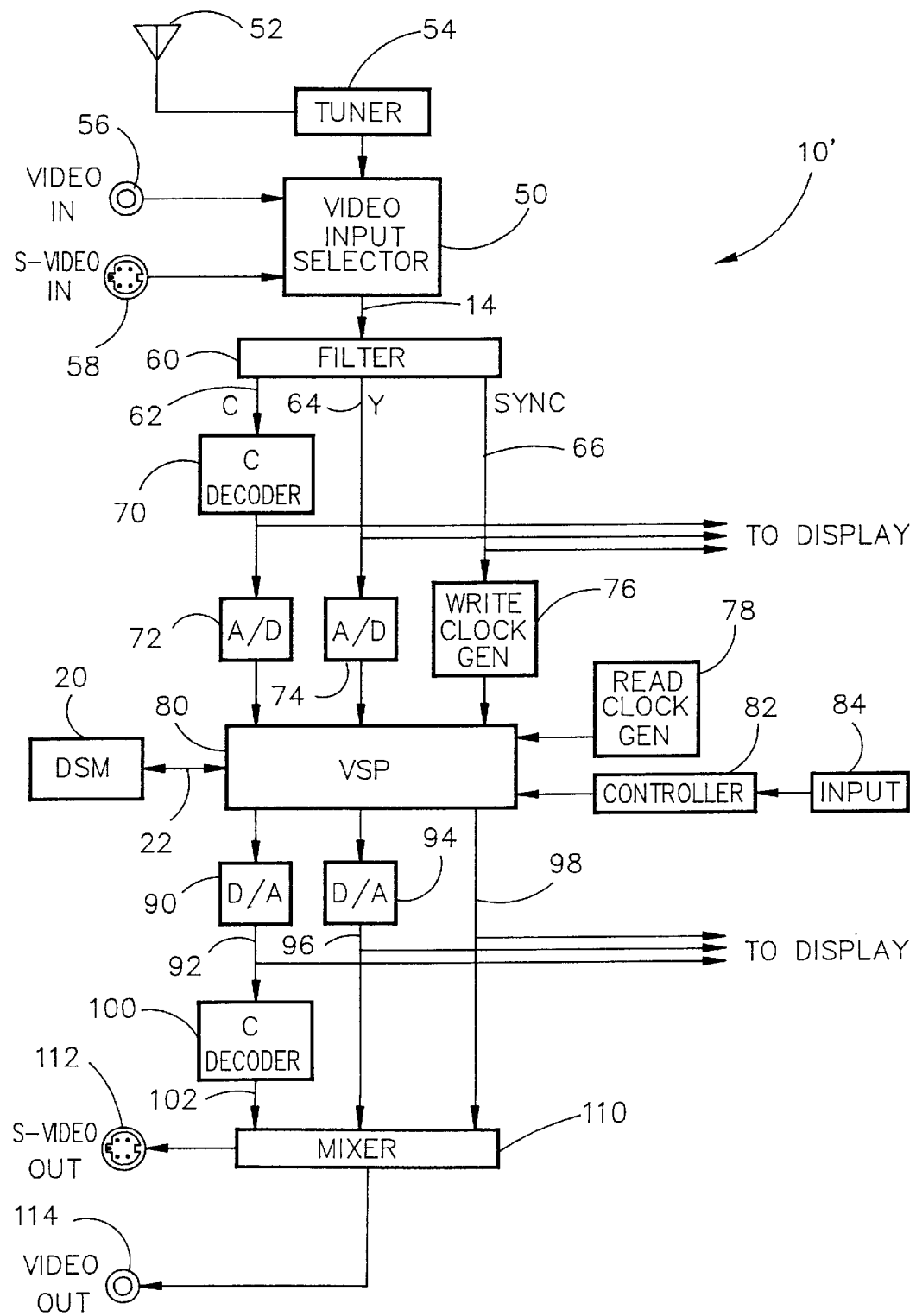
FIG. 2 is a somewhat schematic diagram of a second embodiment according to the present invention.

FIG. 2 is a somewhat schematic diagram of a second embodiment according to the present invention. An analog video signal 14 is selected from several video inputs via video input selector 50. Signal 14 may comprise input from antenna 52 and tuner 54 to produce an electric video signal from radio waves modulated with a video signal. Alternatively, a composite video signal may be output from a video device such as a video camera, television camera, video tape recorder, laser disc player, a DVD player, and the like, to input 56, e.g., via an RCA type connector. Preferably an S-video input 58, e.g., via a 4-conductor mini DIN type connector, is also provided. When the video input is an S-video signal, the Y, C signals are separated, and the Y, C separator of filter 60 may be bypassed. Alternatively the electric video signal 14 may arrive via a cable.

A second tuner (not shown) may be provided, allowing a viewer to record one channel while watching another, and support for viewing a picture within a picture may likewise be provided.

The digital signal 14 will typically be in one of the three major formats: NTSC, PAL, or SECAM. NTSC (National Television System Committee) is the video standard used in the United States. NTSC employs interlace scanning at a rate of 30 frames per second (field frequency of 60 Hz), with 525 lines per frame and an image format of 4:3. PAL (Phase Alteration by Line) and SECAM (Séquential á Mémoire) employ interlace scanning at a rate of 25 frames per second (field frequency of 50 Hz), with 625 lines per frame.

In standard television mode, the TV with hard disk drive 10 (FIG. 1) or 10' (FIG. 2) according to the present invention may be used in the same manner as a conventional television, wherein the composite video signal 14 may be converted to a component video signal via filter/separator 60 and C signal demodulator 70 and output to a display.

When TV with hard disk drive 10 is in record mode, composite video signal 14 is fed to filter/separator 60 whereby the synchronization signal 66 and Y and C signals 64 and 62, respectively, are separated. C signal 62 is demodulated by decoder 70 and digitized by A/D converter 72 and applied to video signal processor 80. Y signal 64 is converted to a digital signal by A/D converter 74 and applied to video signal processor 80. Video signal processor 80 comprises memory for storing video frame information and processing circuitry for compressing the digital video signals. The video signal is preferably converted to a conventional data file format. A write clock generator 76 may be supplied on the basis of synchronization signal 66. A read clock is provided by read clock generator 78. Once compressed and converted to a suitable data file format, the digitized video is transferred via data bus 22 to digital storage medium 20 for storage.

When the stored data is replayed, the data is transferred via data bus 22 from digital storage medium 20 to the video signal processor 80 and decompressed. The digitized C signal is fed to D/A converter 90 to produce analog C signal 92 and the digitized Y signal is fed to D/A converter 94 to produce analog Y signal 96. A synchronization signal 98 is also provided. The component signals 94, 96, and 98 may then be sent to a display. Where the desired output is a composite video signal, the C signal is modulated to a carrier chrominance signal 102. Mixer 110 mixes the signals to provide an S-video signal output 112 or composite video signal 114.

Figure 3:
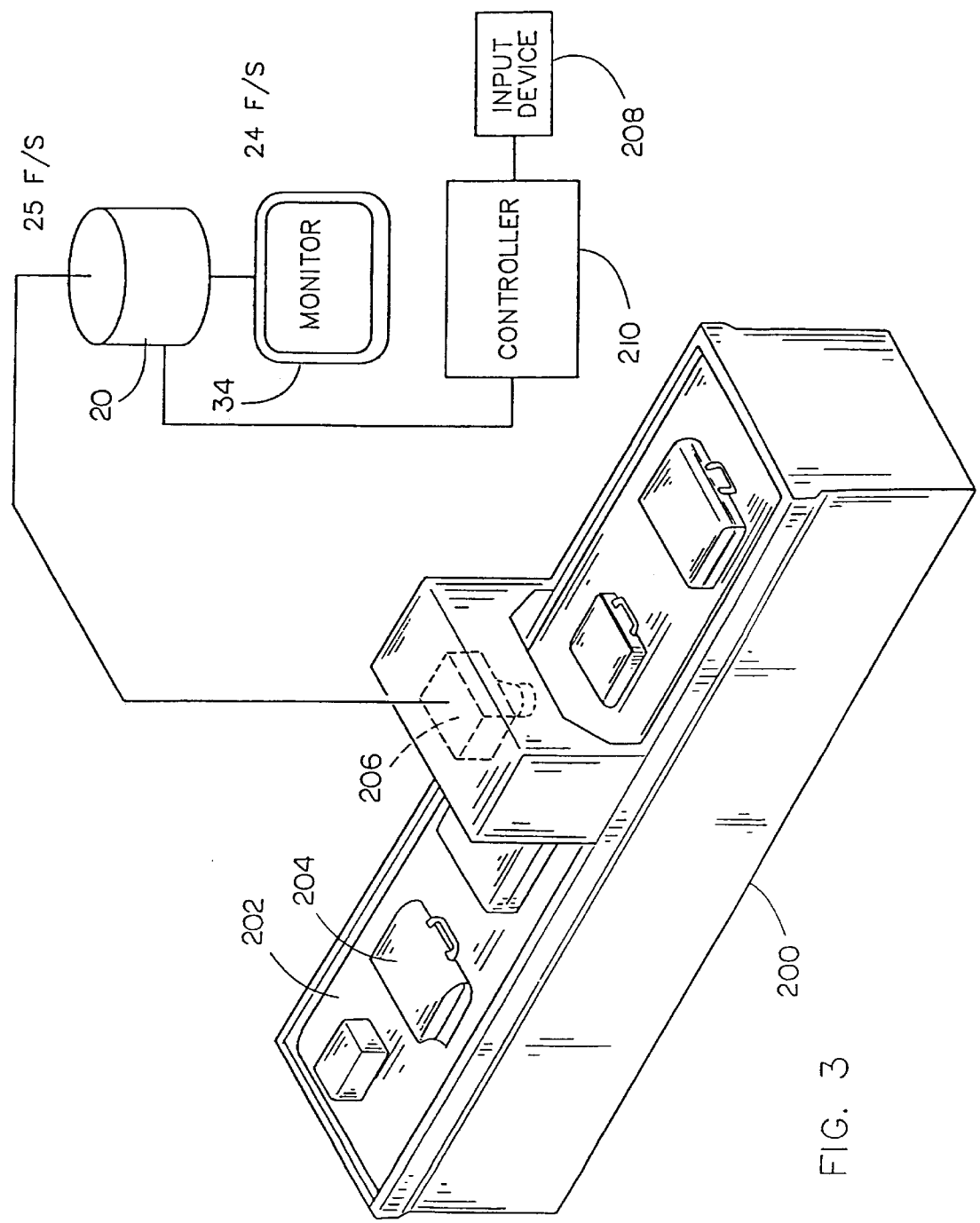
FIG. 3 depicts another embodiment according to the present invention wherein the analog video source is a x-ray camera of the type used in a security installation.

Other uses of the apparatus according to the present invention, in addition to its use in providing control over viewing television programs include, for example, use in tracking, security, or other video monitoring situations. FIG. 3 depicts a security x-ray machine 200 of the type used to inspect packages brought into a secured area, such as an airport, courthouse, and the like. X-ray machine 200 comprises a moving conveyor belt 202 whereby packages or luggage 204 may be placed for inspection of their contents as they pass beneath x-ray camera 206. By digitizing and storing images of the video signal thus produced on hard drive 20, an operator has the option of viewing images in real time, freezing particular frames, and reviewing portions of the video that warrant closer inspection, e.g., via monitor 34, without the need to stop the conveyor. The recording and displaying of the recorded video is preferably controlled by an input device 208, such as a keyboard, and controller circuitry 210.

Figure 4:
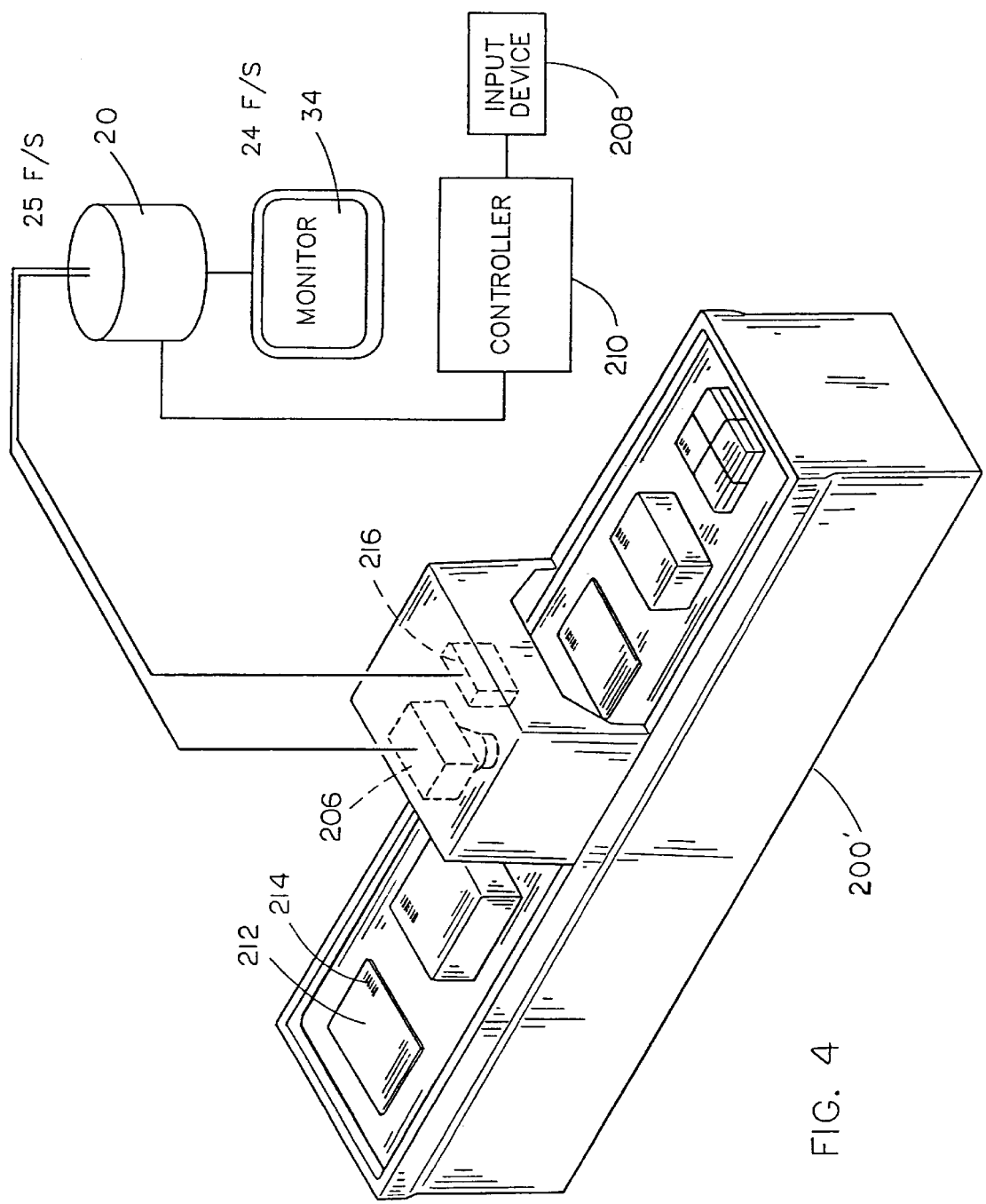
FIG. 4 depicts yet another embodiment according to the present invention similar to the embodiment of FIG. 3, wherein an x-ray camera or a video camera is adapted for postal, delivery route, or other such uses, wherein packages containing bar codes or other optically readable indicia may be recorded and/or optically scanned.

FIG. 4 depicts a conveyor 200' x-ray machine similar to that shown in FIG. 3, or which may be a conveyor with a conventional video camera, such as a postal conveyor, or the like. The apparatus 200' is adapted for postal, delivery route, or other such use wherein packages 212 containing bar codes or other optically readable indicia 214 may be recorded to provide a video record of packages handled or to provide x-ray inspection via video source 206 and whereby the data stored in optically readable form via optically readable indicia 214 may be scanned by optical indicia reader 216, and the information contained therein may be associated with the video information for the corresponding package and stored on hard disk drive 20 together with the video information. In an alternative embodiment, where video source 206 is a video camera, the optical symbology may be decoded directly from the video signal.

The video data stored by the apparatuses according to FIGS. 3 and 4 may be saved on hard drive 20 for a predetermined period of time, after which, the contents of the hard drive may be deleted or flushed from memory. The present invention preferably allows the stored video to be condensed into a time lapse video to be downloaded for storage at a remote location.

Figure 5:
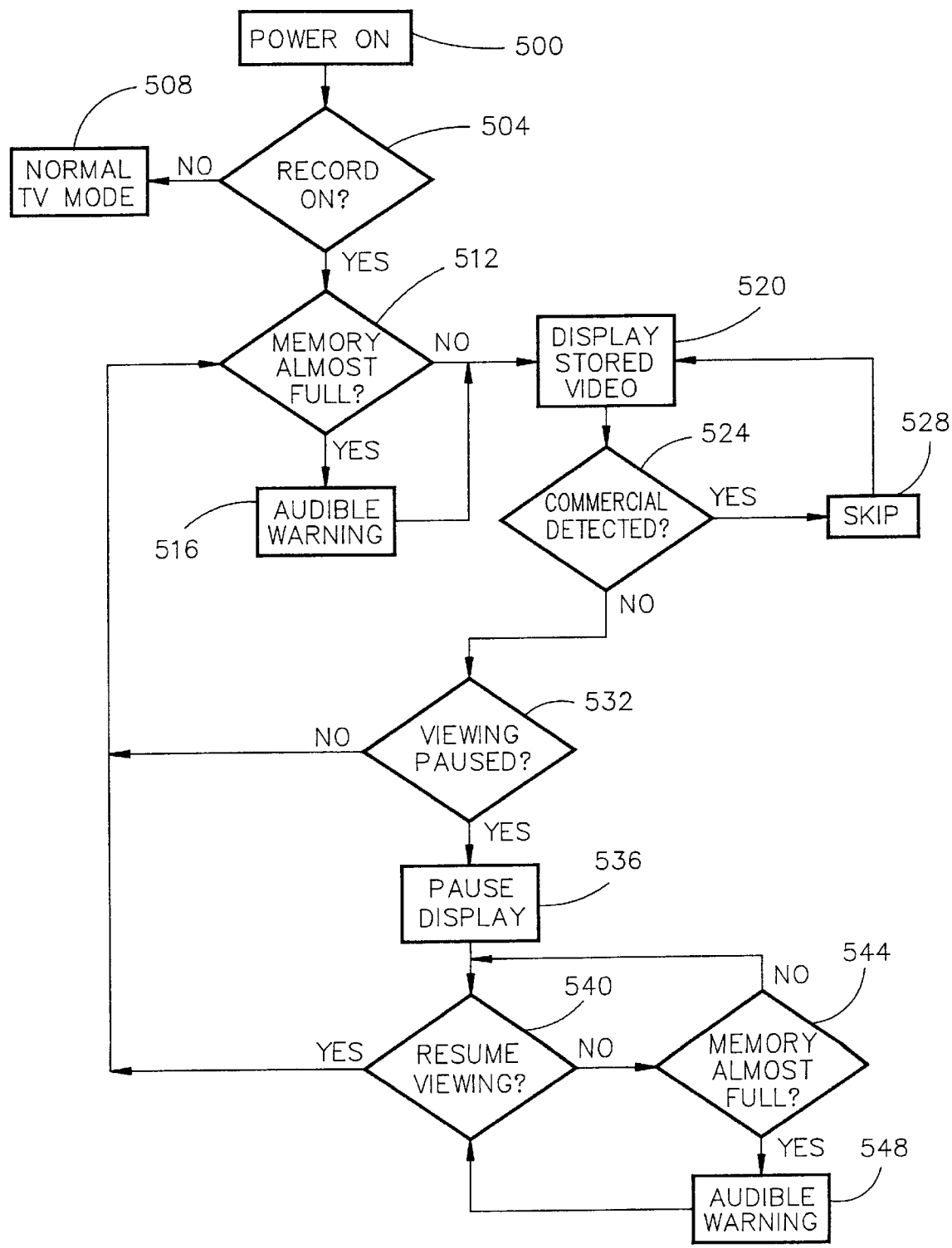
FIG. 5 depicts a flow chart outlining a preferred method according to the present invention.

FIG. 5 depicts a flow chart of preferred method viewing a television program or other video material which provides a viewer with flexibility in pausing, reviewing, and in the time required to review a video program. The apparatus according to the present invention is powered on by a viewer in step 500. In step 504, the viewer may input the desired viewing mode. If recording and storage of the video signal is not desired, the apparatus essentially functions as a TV and the video signal is watched in real time in step 508.

If record mode is selected, the analog video signal will be digitized and stored on a hard disk drive or other mass storage device. In step 512, the memory space available on the hard disk drive is checked to determine if the space available has fallen below some predetermined value. If the memory available has fallen below a predetermined level, e.g., if the hard drive is over half full, three fourths full, etc., memory can be conserved by lowering the video resolution (i.e., color and/or pixel resolution) of any subsequently recorded video. Also, frames can be dropped, for example, where 2 consecutive frames would ordinarily be displayed, memory can be conserved by playing the first frame twice. Different degrees of such space saving mechanisms can be utilized depending on how much space is available, becoming more drastic in terms of perceptibility to the viewer as the hard disk drive gets fuller. Storage memory requirements may also be reduced by omitting and then interpolating adjacent lines.

If the memory space available falls below a predetermined value, an audible signal is sounded in step 516 and the method returns to step 520. The memory will typically tend to become full when the viewer has paused viewing (step 532) for a long period of time or has allowed a portion of the video to accumulate in memory so that it may be watched at a later time in a shorter amount of time. The memory will tend to become full when a viewer is watching a program at a rate slower than the standard mode, i.e., for an NTSC signal, at a rate less than 30 frames per second (fps). For example, a viewer who is taking notes may play the stored video at a frame rate slower than the analog signal is input, or may frequently pause playback. The audible signal warns the viewer that the memory is getting full and that it is time to resume viewing (or time to increase the viewing rate) in order to avoid the risk of flushing a portion of the programming that has not yet been viewed out of memory.

Although it would be advantageous to provide a storage space that is large enough to store an entire program of typical duration such as thirty minutes, one hour, two hours, etc., or longer, it is not necessary to do so in order to provide the functionality of allowing a viewer to control when viewing breaks are taken, to skip commercials, to replay portions of interest, etc.

The stored video is decompressed and replayed in step 520. The viewer may input a desired frame rate that is either faster or slower than the original signal. A slower frame rate may be selected to allow a buffer to accumulate when a program is watched from the beginning. For example, the frame rate may be accelerated of decelerated by 1 fps, 2 fps, 3 fps, 4 fps, 5 fps, or more. The frame rate may be accelerated or decelerated either by increasing or decreasing the refresh rate of the display, or by frame dropping or duplication. For example, a 30 fps NTSC signal can be digitized and replayed at a frame rate of 25, 26, 27, 28, 29, 31, 32, 33, 34, or 35 fps by changing the rate at which display screen is scanned, or alternatively, holding the scanning rate constant (field frequency of 60 Hz for NTSC) while dropping 1, 2, or 3 frames per second, or duplicating 1, 2, or 3 frames per second.

Where the frame rate is significantly slower than the television standard, frame insertion is recommended. For example, where it is desired to slow down a signal greatly, problems with screen flicker arise as the scanning rate is decreased. Thus, for example, if an NTSC signal is desired to be slowed by one half, it is preferable to maintain the field frequency at 60 Hz and to play each frame twice, resulting in an effective frame rate of 15 fps.

Where the frame rate is significantly faster than the original signal, e.g., where a user wishes to watch a recorded signal at double speed, it is desirable to digitally process the sound signal so as to provide accelerated playback while maintaining the original pitch.

Whether the stored signal is a commercial may be determined in optional step 524 and the commercial may be skipped in step 528.

Whether a viewer has paused viewing is detected in step 532. If viewing has not paused, display of the stored video is continued and the procedure returns to step 512. If viewing is paused, output of the stored video to the display is paused in step 536. Whether viewing has resumed is determined in step 540. If viewing has resumed, the method returns to step 512. If viewing is still paused, the memory is checked in step 544. If the available memory is not below a predetermined value, the method returns to step 536 and if the available memory is below a predetermined value, an audible warning is signaled in step 548 whereupon the process returns to step 540.

The description above should not be construed as limiting the scope of the invention, but as merely providing illustrations to some of the presently preferred embodiments of this invention. For example, circuitry which enhances the separation of the luminance and chrominance signal components may be provided, as well as any other receiver implemented techniques which do not depend on picture origination equipment. Also, the video signal processor may further comprise circuitry that allows the conversion from one television standard to another, for example, an NTSC broadcast could be recorded in PAL format, a PAL videotape recording could be input with a PAL VTR and converted and dubbed in NTSC format using an NTSC VTR. Also, the A/D converter can be bypassed when a video signal is already in a digital-compatible form as received. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

What is claimed is:

1. An apparatus that receives video signals corresponding to a television program from a video source for display on a television screen, the apparatus comprising:

a disk drive;

a video processing system that stores a sequential representation of the television program on the disk drive as the video signals are received from the video source;

the video processing system begins retrieving the sequential representation of at least portions of the television program, for playback of the at least portions of the television program on the television screen, from a location in the sequential representation of the television program stored on the disk drive while the video processing system continues to store on the disk drive the sequential representation of the television program received from the video source;

a viewer interface communicatively coupled to the video processing system; and the video processing system responds to the viewer interface by repositioning the location in the sequential representation of the television program to correspondingly reposition the playback of the television program on the television screen while the video processing system continues to store on the disk drive the sequential representation of the television program received from the video source.

2. The apparatus of claim 1 wherein the video processing system repositions the location after detecting a commercial.

3. The apparatus of claim 13 wherein the repositioning of the location by the video processing system provides fast forwarding display of the television program on the television screen.

4. The apparatus of claim 1 wherein the repositioning of the location by the video processing system provides fast rewinding display of the television program on the television screen.

5. The apparatus of claim 1 wherein the repositioning of the location by the video processing system provides instant play back display of the television program on the television screen.

6. The apparatus of claim 1 wherein the repositioning of the location by the video processing system skips portions of the sequential representations of the television program that correspond to a commercial.

7. The apparatus of claim 1 wherein the repositioning of the location by the video processing system provides paused display of the television program on the television screen.

8. The apparatus of claim 1 wherein the repositioning of the location by the video processing system provides an adjustable playback rate display of the television program on the television screen.

9. An apparatus that receives television video signals from a video source for display on a television screen, the apparatus comprising:

a disk drive;

a video processing system that receives the television video signals from the video source;

the video processing system stores the television video signals, received from the video source, on the disk drive;

a viewer interface communicatively coupled to the video processing system;

the video processing system retrieves, for display on the television screen, a portion of the television video signals that are stored on the disk drive while continuing to store the television video signals received from the video source on the disk drive; and the viewer interface permitting selection of the portion of the television video signals.

10. The apparatus of claim 9 wherein the television video signal is a cable television signal.

11. The apparatus of claim 9 wherein the viewer interface provides selective control of the television video signals that are displayed on the television screen.

12. The apparatus of claim 9 wherein the video processing system provides for instant replay of the television video signals.

13. The apparatus of claim 9 wherein the television video signals being stored and retrieved comprise a television program.

14. The apparatus of claim 13 wherein the television program includes a commercial, and the video processing system responds to the viewer interface by automatically skipping the commercial.

15. The apparatus of claim 13 wherein the viewer interface configures the video processing system to fastforward the television program while storing the television video signals.

16. The apparatus of claim 13 wherein the viewer interface configures the video processing system to pause the retrieval of the television program from the disk drive.

17. The apparatus of claim 13 wherein the viewer interface configures the video processing system to select an offset skip ahead in the television program.

18. The apparatus of claim 9 wherein the video processing system provides for skipping of selected portions of the television video signals.

19. The apparatus of claim 9 wherein the television video signals being stored and retrieved comprise recording of a first television program while the television video signals being retrieved comprise a second television program.

20. A method for receiving television video signals from a video source display on a television screen, the method comprising:

obtaining a disk drive;

configuring a video processing system to receive the television video signals from the video source;

storing on the disk drive, with the video processing system, the television video signals received from the video source; and retrieving, with a viewer interface that is communicatively coupled to the video processing system, for display on the television screen, a portion of the television video signals that are stored on the disk drive while continuing to store the television video signals received from the video source.

21. The method of claim 20 wherein said configuring the video processing system to receive the television video signals from the video source comprises storing a television program on the disk drive.

22. The method of claim 21 wherein the video processing system automatically skips undesired portions of the television program.

23. The method of claim 21 wherein the video processing system records a first television program on the disk drive while simultaneously displaying a second television program on the television screen.

24. The method of claim 21 wherein the video processing system displays the television program on the television screen at a selected frame display rate.

25. The method of claim 20 wherein the video source is a cable that is coupled to the video processing system.

26. The method of claim 20 wherein the video processing system is configured to pause the display of the television video signals on the television screen.

* * * * *